United States Patent
Koreishi et al.

(10) Patent No.: US 12,391,156 B2
(45) Date of Patent: Aug. 19, 2025

(54) VEHICLE SEAT STRUCTURE

(71) Applicant: TOYOTA JIDOSHA KABUSHIKI KAISHA, Toyota (JP)

(72) Inventors: Norimasa Koreishi, Miyoshi (JP); Hideo Takeda, Hekinan (JP); Hitoshi Takezoe, Seto (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 415 days.

(21) Appl. No.: 18/124,029

(22) Filed: Mar. 21, 2023

(65) Prior Publication Data
US 2023/0302968 A1 Sep. 28, 2023

(30) Foreign Application Priority Data
Mar. 23, 2022 (JP) .................. 2022-046441

(51) Int. Cl.
| | | |
|---|---|---|
| *B60N 2/24* | (2006.01) | |
| *B60N 2/64* | (2006.01) | |
| *B60N 2/68* | (2006.01) | |
| *B60R 22/24* | (2006.01) | |
| *B60R 22/34* | (2006.01) | |

(52) U.S. Cl.
CPC ............... *B60N 2/242* (2013.01); *B60N 2/64* (2013.01); *B60N 2/688* (2013.01); *B60R 22/24* (2013.01); *B60R 22/34* (2013.01); *B60R 2022/3402* (2013.01)

(58) Field of Classification Search
CPC ............. B60N 2/688; B60N 2/242; B60R 2022/3402; B60R 22/22; B60R 22/24
See application file for complete search history.

(56) References Cited

U.S. PATENT DOCUMENTS

| | | | | |
|---|---|---|---|---|
| 2007/0107969 A1* | 5/2007 | Ootani | .................. | B60N 2/688 |
| | | | | 296/68.1 |
| 2022/0324413 A1* | 10/2022 | Tchepikov | .............. | B60R 22/24 |

FOREIGN PATENT DOCUMENTS

| | | | | |
|---|---|---|---|---|
| CN | 110214100 B | * | 9/2021 | ............. B60R 22/34 |
| CN | 218616564 U | * | 3/2023 | |
| JP | 2003-025891 A | | 1/2003 | |

\* cited by examiner

*Primary Examiner* — Daniel J Colilla
(74) *Attorney, Agent, or Firm* — Dinsmore & Shohl LLP (57) ABSTRACT

A space for installing a seat mechanism can be reduced as compared with a prior art when a seatback is supported by support members. A rear panel is provided upright to partition an inside and an outside of a vehicle cabin. A seat support body includes support columns that are fixtures and seat crosses that are support members. The support columns are fixed to a rear panel. The seat crosses are supported by the rear panel with a gap therebetween via the support columns. Each seatback is supported on a back face thereof by the seat crosses. A belt path through which a webbing extends from a retractor to a shoulder anchor is formed in the gap between the seat crosses and the rear panel.

2 Claims, 7 Drawing Sheets

VEHICLE SEAT STRUCTURE

CROSS REFERENCE TO RELATED APPLICATION

This application claims priority to Japanese Patent Application No. 2022-046441, filed on Mar. 23, 2022, which is incorporated herein by reference in its entirety including the specification, claims, drawings, and abstract.

TECHNICAL FIELD

The present specification discloses a vehicle seat structure including a seat and a seat belt mechanism of a vehicle.

BACKGROUND

A vehicle seat includes a seat cushion that serves as a seat, a seatback that serves as a backrest, and a headrest disposed above the seatback. For example, JP 2003-25891 A discloses a seatback including a seatback frame and a headrest frame that are integrally formed. An upper end of the seatback is supported by an upright wall of a vehicle body (for example, a partition wall of a vehicle cabin) disposed behind the seatback. A lower end of the seatback is supported on a floor face of the vehicle cabin.

A seat belt mechanism further includes, in addition to a webbing that serves as a belt, a retractor, a shoulder anchor, a belt anchor, a belt buckle, and a tongue plate. The retractor is disposed behind the seatback and takes up and accommodates the webbing. The webbing pulled out upward from the retractor is folded back by the shoulder anchor and is pulled forward of the seatback. Furthermore, a lower end of the webbing pulled out is fixed to the belt anchor. The webbing is inserted through the tongue plate, and a tip plate part of the tongue plate is inserted into the belt buckle when the seat belt mechanism is worn.

Incidentally, for securing rigidity of the seatback, in some cases support members (for example, a grid-like framework) having a higher rigidity than that of the partition wall of the vehicle body might be provided to support the seatback. Furthermore, in addition to the seatback, the seat belt mechanism might be fixed to the support members. In such a case, in order to provide a webbing path extending from the retractor to the shoulder anchor (a so-called belt path) behind the seatback, it is necessary to form a gap between a back face of the seatback and the support members. Securing this gap might cause an increase in space (make the space voluminous) for installing the seat mechanism.

To cope with this, the present specification discloses a vehicle seat mechanism capable of reducing a space for installing a seat mechanism as compared with the prior art when a seatback is supported by support members.

SUMMARY

The present specification discloses a vehicle seat structure. This seat structure includes: a partition wall; a seat support body; a seatback; a retractor; and a shoulder anchor. The partition wall is provided upright to partition an inside and an outside of a vehicle. The seat support body includes a fixture and a support member. The fixture is fixed to the partition wall. The support member is supported by the partition wall with a gap via the fixture. The seatback is supported on a back face thereof by the support member. The retractor is supported by the partition wall, and takes up and accommodates a webbing of a seatbelt mechanism. The shoulder anchor, through which the webbing is inserted, is supported by the partition wall at a position higher than a support position of the retractor. A belt path through which the webbing extends from the retractor to the shoulder anchor is formed in the gap between the support member and the partition wall.

According to the above configuration, the retractor and the shoulder anchor are fixed to the partition wall, and the gap provided for fixing the support member to the partition wall is used as a belt path; therefore, it is unnecessary to provide a gap for the belt path between the support member and the seatback.

In the above configuration, the support member includes a seat cross extending in the vehicle width direction. This seat cross is disposed at a position between the shoulder anchor and the retractor in the vehicle height direction and closer to the retractor than to the shoulder anchor. The seat cross is formed in a hat-shape in a cross section including: a main body that is Π-shaped in a cross section and has an opening facing the partition wall; an upper flange provided to extend upward from an upper end of the main body; and a lower flange provided to extend downward from a lower end of the main body. The lower flange is formed with a bent portion at a position of the lower flange facing the webbing extending through the belt path in such a manner that the bent portion is cut off on both sides in the vehicle width direction at the position and is bent so as to be separate from the webbing.

According to the above configuration, contact between the webbing and the edge of the lower flange is suppressed, to thereby suppress damage of the webbing.

According to the vehicle seat structure disclosed in the present specification, it is possible to reduce a space for installing the seat mechanism as compared with the prior art when the seatback is supported by the support member.

BRIEF DESCRIPTION OF DRAWINGS

Embodiments of the present disclosure will be described based on the following figures, wherein.

DESCRIPTION OF EMBODIMENTS

Hereinafter, a vehicle seat structure according to embodiments will be described with reference to the drawings. Shapes, materials, numbers, and numerical values described below are examples for explanation, and can be changed as appropriate in accordance with the specifications of the seat structure. In the following, equivalent components are denoted by the same reference numerals in all drawings.

In FIG. 1 to FIG. 7, for the purpose of indicating positions and directions of each component, an orthogonal coordinate system including FR, RW, and UP axes is used. The FR axis is a vehicle front-rear direction axis with a vehicle forward direction as a positive direction. The RW axis is a vehicle width direction axis with a vehicle rightward direction as a positive direction. The UP axis is a vehicle height direction with an upward direction as a positive direction.

Figure 1:
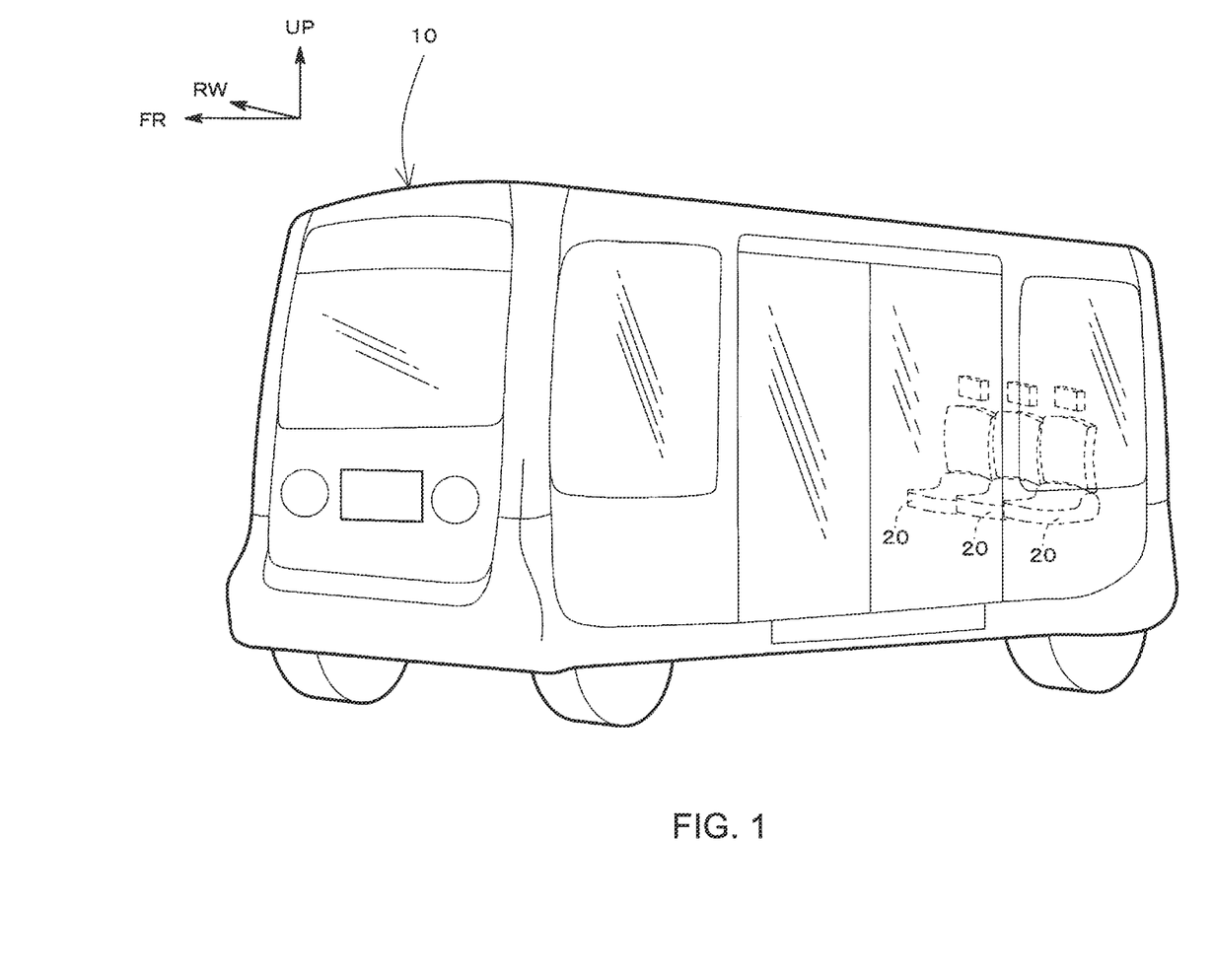
FIG. 1 is a view illustrating a vehicle including a seat structure according to the present embodiment.

FIG. 1 illustrates an appearance of a vehicle 10 provided with the seat structure according to the present embodiment. The vehicle 10 is a shared vehicle, such as a bus, for example. For example, the vehicle seat structure according to the present embodiment is applied to rearmost seats 20 in a vehicle cabin. However, the vehicle seat structure according to the present embodiment is not limited to the rearmost seats 20 in the vehicle cabin. As will be described later, the vehicle seat structure according to the present embodiment is applicable to a seat structure so long as the seat structure is configured such that a support body is disposed before a partition wall provided upright to partition an interior and an exterior of the vehicle cabin and each seatback is supported by this support body.

Figure 2:
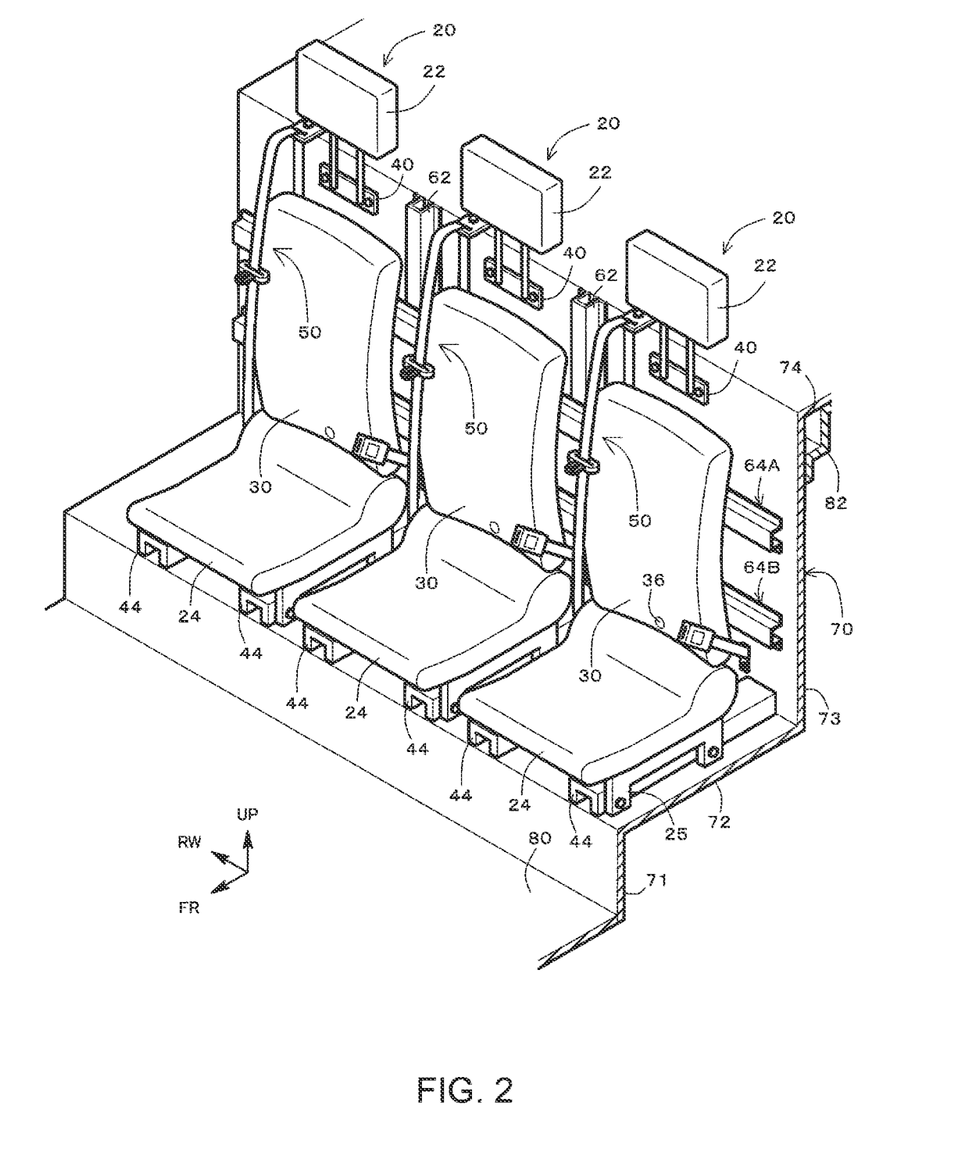
FIG. 2 is a perspective view illustrating the seat structure according to the present embodiment.

FIG. 2 illustrates the seats 20 and seat belt mechanisms 50 installed in the vehicle cabin. In addition to the seats 20 and the seat belt mechanisms 50, the vehicle seat structure according to the present embodiment further includes, for example, a seat support body 60 (see FIG. 5) and a partition wall (illustrated as a rear panel 70 in FIG. 5).

With reference to FIG. 2, the seats 20 for three passengers are disposed at a rearmost position of the vehicle cabin. However, depending on the width of the vehicle cabin, the width of the seats 20, or the like, the seats 20 for any number of passengers may be disposed at the rearmost position of the vehicle cabin.

<Partition Wall>

The vehicle cabin is partitioned by a partition wall that partitions the inside and the outside of the vehicle cabin. FIG. 2 illustrates the rear panel 70 and a floor panel 80 as the partition wall. The floor panel 80 is a floor plate of the vehicle cabin, and has a low floor structure that allows a wheelchair to enter the vehicle 10, for example.

The rear panel 70 is provided upright at a rearmost position of the vehicle cabin. A lower end of the rear panel 70 is connected to a rear end of the floor panel 80. For example, the rear panel 70 has a stepped structure, and the seats 20 are installed in accordance with this stepped structure.

The rear panel 70 includes a leg plate 71 and a back plate 73 that are upright plates. The rear panel 70 also includes a seat plate 72 and a top plate 74 that are horizontal plates. The leg plate 71 is provided upright such that a lower end of the leg plate 71 is connected to the rear end of the floor panel 80. The leg plate 71 faces legs of passengers sitting on the seats 20.

In addition, although "being provided upright" typically refers to an aspect of being provided to extend in the vertical direction, the present disclosure is not limited to this aspect. For example, an aspect of having an installation angle within a predetermined assembly tolerance is also included, hereinafter, in the above aspect of being provided upright. Further, a plate surface may be partially subjected to curved surface processing or may be provided with surface beads processed to be uneven for improving surface rigidity. These fabricated structures are omitted in FIG. 1 to FIG. 7, for simplicity of illustration.

Figure 3:
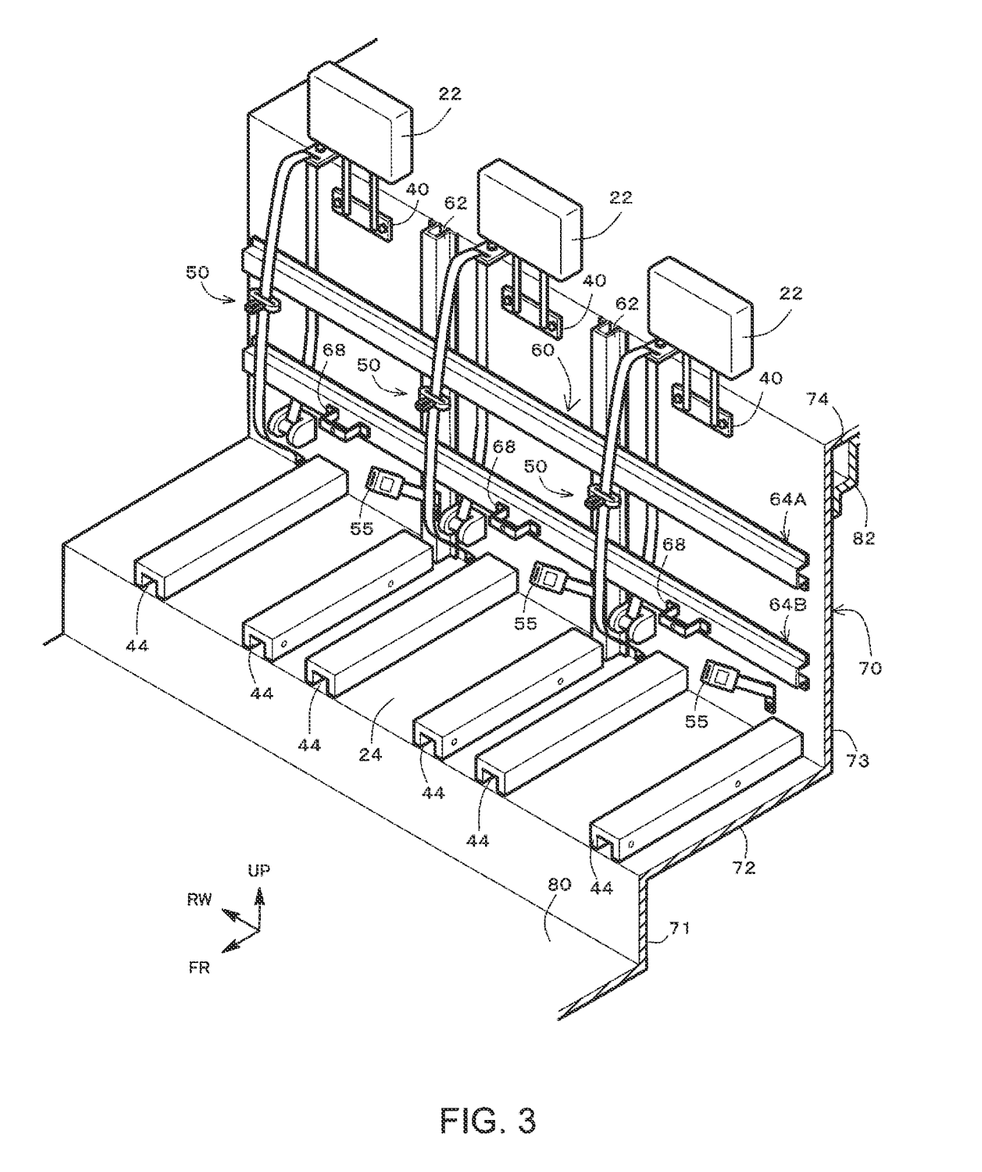
FIG. 3 is a perspective view illustrating an example when seats are removed from FIG. 2.

With reference to FIG. 2 and FIG. 3, the seat plate 72 is provided below seat cushions 24. For example, in a space below the seat plate 72 (space outside the vehicle cabin), driving devices, such as a transmission and a rotary electric machine of the vehicle 10, are accommodated.

Support frames 44 are disposed on the seat plate 72. The support frames 44 are support members provided to extend in the vehicle front-rear direction. For example, the support frames 44 are each formed in a Π-shape in a cross section, and are provided in pairs for each seat 20. As illustrated in the drawing, the support frames 44 support the seat cushions 24 via seat cushion brackets 25.

The back plate 73 is an upright plate provided behind back faces of the seatbacks 30. A lower end of the back plate 73 is connected to a rear end of the seat plate 72. For example, a rear cross 82 that is a framework member is provided to extend in the vehicle width direction at an upper end of a back face (an externally exposed surface of the vehicle) of the back plate 73. The rear cross 82 is connected to pillars (not illustrated) provided at both ends in the vehicle width direction of the vehicle 10.

The seat support body 60 that supports the seatbacks 30 is fixed to the back plate 73, and the seatbacks 30 are supported by the seat support body 60. Detailed structures of the seat support body 60 and the seatbacks 30 will be described later.

Figure 5:
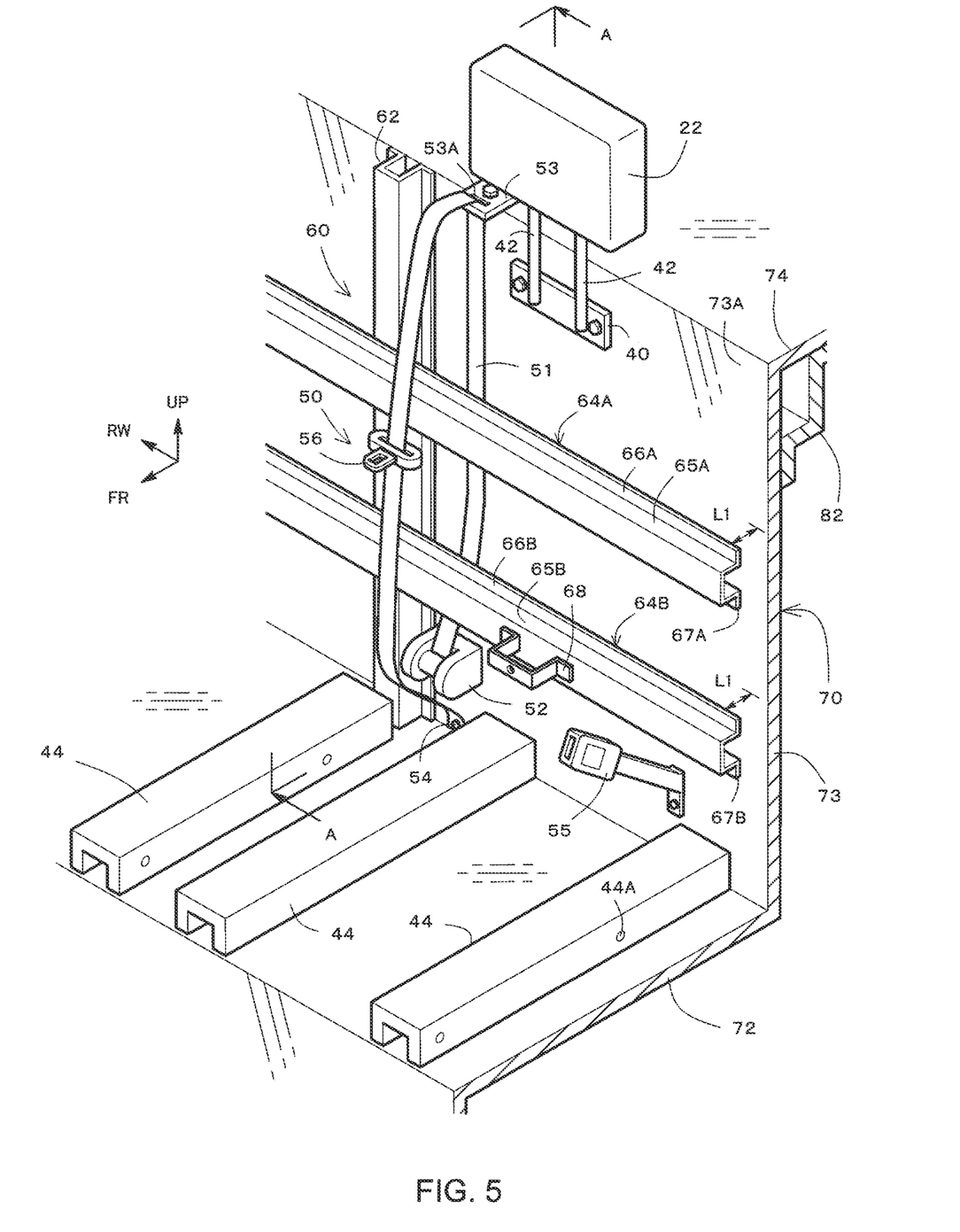
FIG. 5 is an enlarged perspective view of FIG. 3 and illustrating a seat support structure and a seat belt mechanism.
Figure 6:
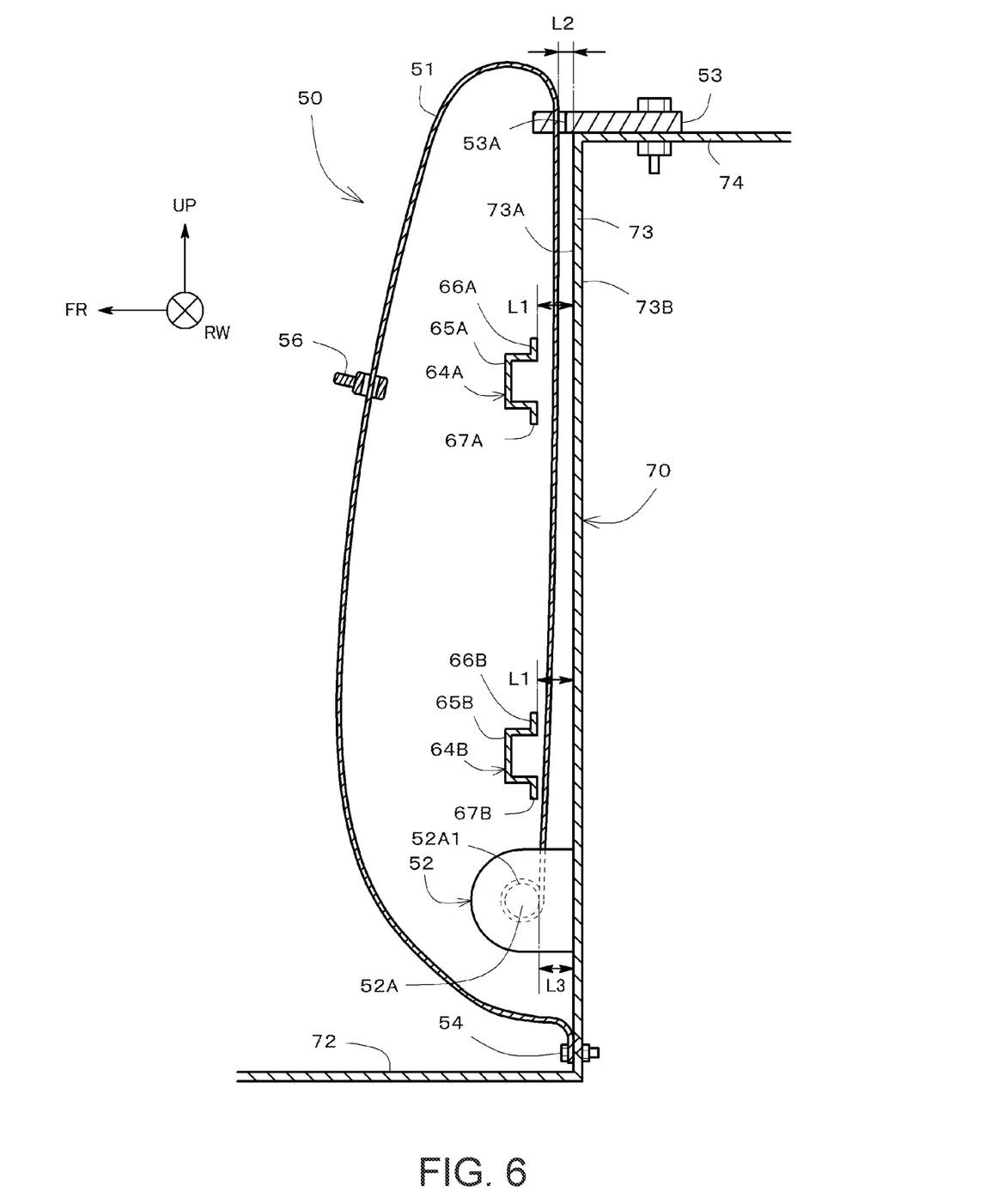
FIG. 6 is a sectional view taken along line A-A of FIG. 5.

With reference to FIG. 5, headrest brackets 40 are supported on an upper part of a front face 73A (internally exposed surface of the vehicle cabin) of the back plate 73, the front face 73A is opposite a rear face 73B (FIG. 6). Furthermore, stays 42 are provided to extend upward from the respective headrest brackets 40, and lower ends of headrests 22 are connected to upper ends of the respective stays 42.

For example, a front face of each headrest 22 that is a contact surface to a passenger, and a front face of each seatback 30 (see FIG. 2) are aligned with each other. For example, the stays 42 are connected to lower ends of rear faces of the respective headrests 22. In addition, for example, the thickness in the vehicle front-rear direction of each headrest 22 is determined such that a distance from the stay 42 to the front face of the headrest 22 is equal to or slightly shorter than a distance from the stay 42 to the front face of each seatback 30.

Figure 4:
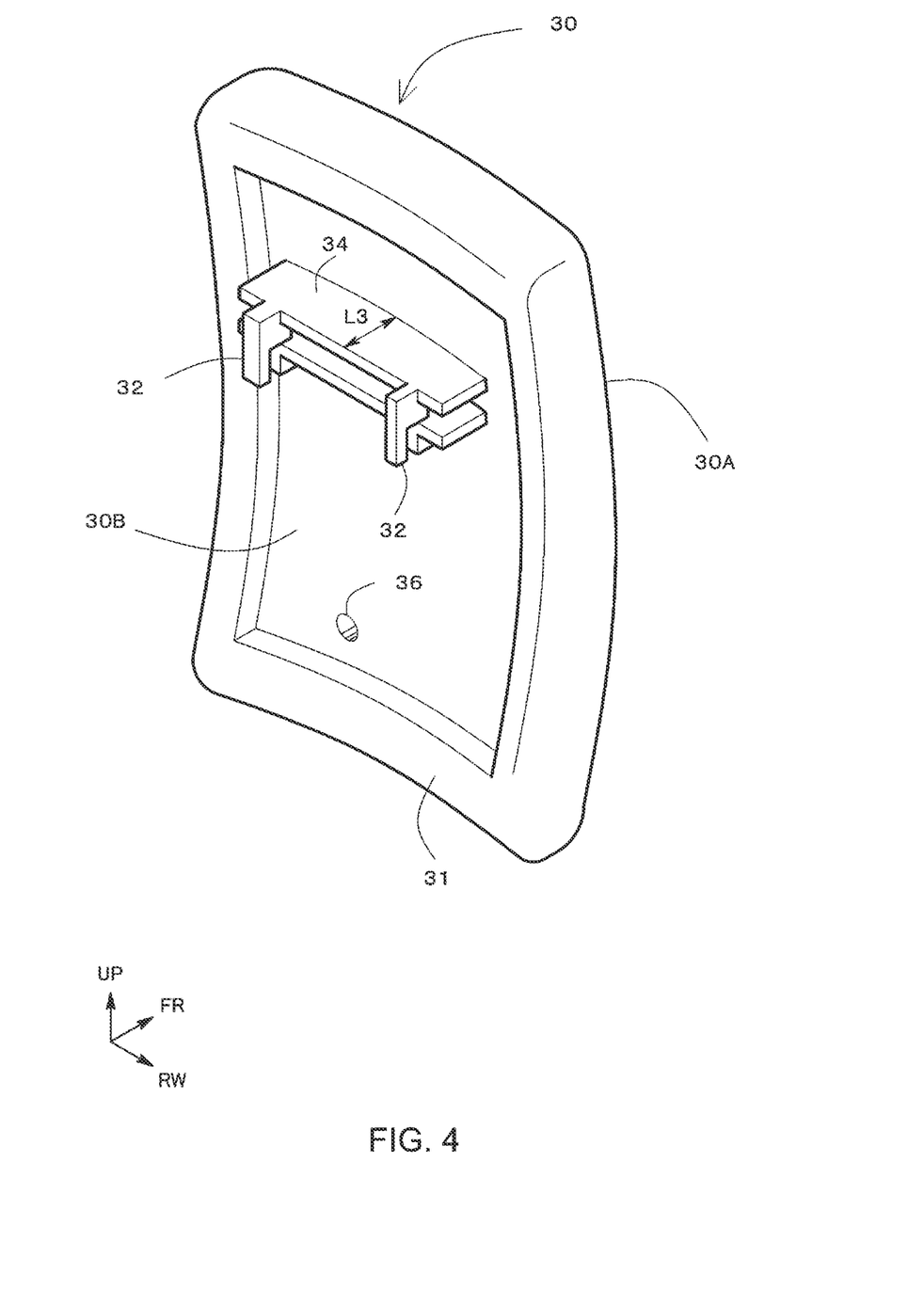
FIG. 4 is a view illustrating a back structure of a seatback.

Each headrest 22 is supported on the rear panel 70 that is the partition wall, instead of being supported on the seatback 30, to thereby reduce support rigidity of the seatback 30. Accordingly, the seatback 30 can be configured in a simple structure including two components of a back plate part 31 and an engagement plate 34, as illustrated in FIG. 4, which will be described later.

Returning to FIG. 5, the seat belt mechanisms 50 included in the seat structure according to the present embodiment are supported on the back plate 73 of the rear panel 70. Each seat belt mechanism 50 includes a retractor 52, a shoulder anchor 53, a belt anchor 54, a belt buckle 55, and a tongue plate 56 in addition to a webbing 51 that is a belt. The detailed structures of these components will be described later.

<Seat Support Body>

As shown in FIG. 3 and FIG. 5, the seat support body 60 includes the support frames 44, support columns 62 (fixtures) and seat crosses 64A, 64B (support members). All of these members are made of rigid members such as aluminum rectangular members. In front of the back plate 73 of the rear panel 70, a grid-like support framework, which includes the support columns 62 that are vertical columns and the seat crosses 64A, 64B that are horizontal columns, is provided upright.

As described above, the support frames 44 are disposed on the seat plate 72 of the rear panel 70 and provided to extend in the vehicle front-rear direction. Each support frame 44 is Π-shaped in a cross section and has an opening that faces downward. The support frames 44 are provided in a pair, for example, at positions corresponding to both side ends in the vehicle width direction of each seat cushion 24 (see FIG. 2).

Side walls of each support frame 44 are formed with fastening holes 44A (see FIG. 5) along the thickness direction of the side walls. After the fastening holes 44A and fastening holes (not illustrated) of the seat cushion brackets 25 (see FIG. 2) are aligned with each other, the seat cushion brackets 25 are fastened to the support frames 44 with bolts and nuts. Accordingly, the seat cushions 24 are supported on the support frames 44.

The support columns 62 are fixtures fixed to the back plate 73 of the rear panel 70 that serves as the partition wall. Upper ends of the support columns 62 are supported by the rear cross 82, for example. The support columns 62 and the rear cross 82 are joined to each other by welding, for example. The support columns 62 are provided upright along the back plate 73. For example, the support columns 62 are provided to extend across the entire height of the back plate 73 (full length of the UP-axis dimension).

Each support column 62 is, for example, a vertical column member that is hat-shaped in a cross section, and has an opening facing the back plate 73. A plurality of support columns 62 are provided along the vehicle width direction. For example, each support column 62 is fixed to the back plate 73 of the rear panel 70 in such a manner as to avoid the headrest bracket 40, the shoulder anchor 53, and the belt buckle 55.

Figure 7:
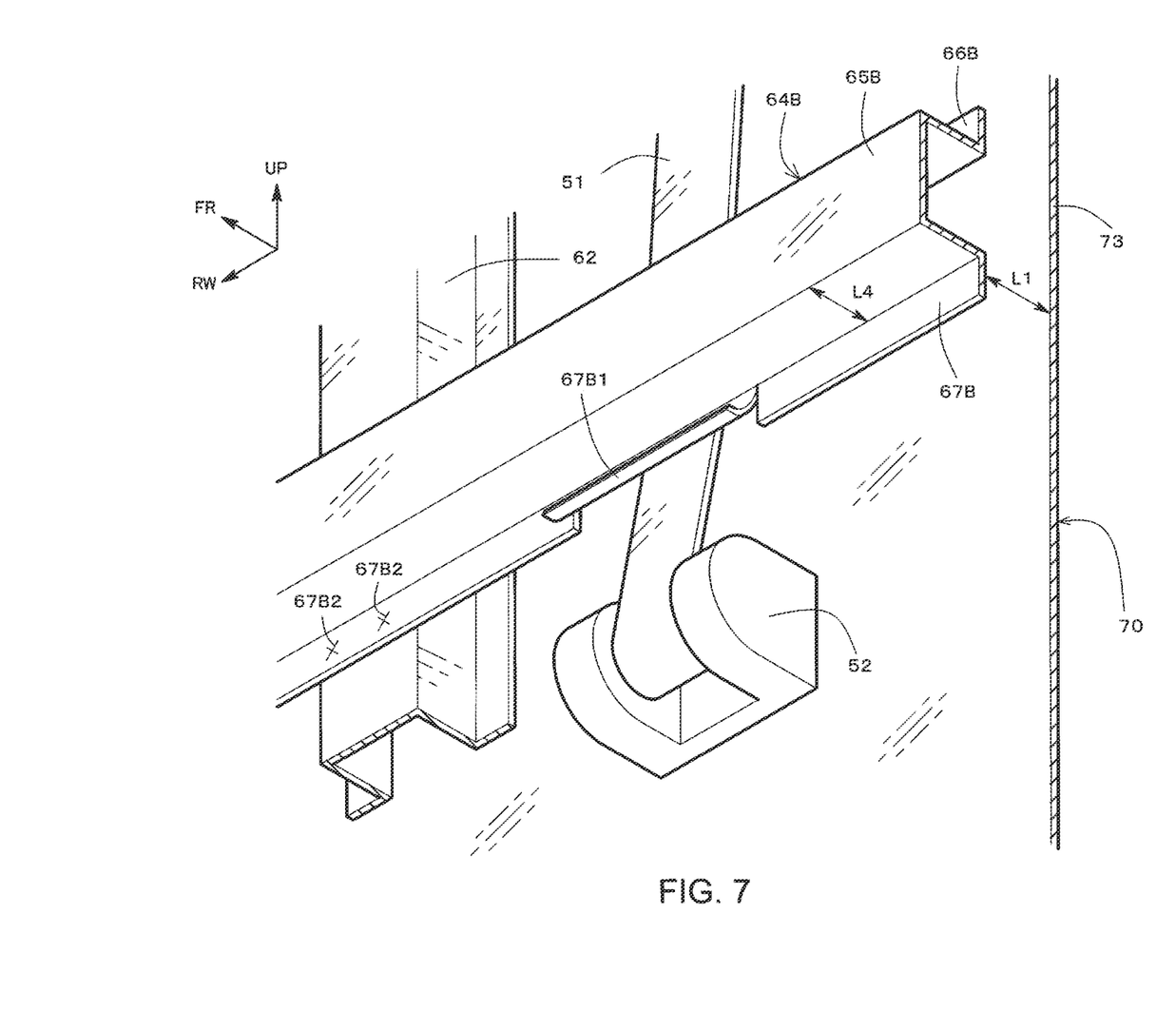
FIG. 7 is a perspective view illustrating a structure around a retractor.

The seat crosses 64A, 64B are horizontal column members provided to extend in the vehicle width direction, and also serve as support members that support the seatbacks 30. The seat crosses 64A, 64B are provided to extend across the entire width in the vehicle width direction of the back plate 73, for example. The seat crosses 64A, 64B are provided between the shoulder anchors 53 and the retractors 52 in the vehicle height direction. In addition, the seat crosses 64A, 64B are provided with a distance therebetween in the vehicle height (up-down) direction. For example, the seat crosses 64A, 64B are joined to each support column 62 by welding at weld spots 67B2 as illustrated in FIG. 7, for example.

As shown in FIG. 5, the seat crosses 64A, 64B are each formed in a hat-shape in a cross section. More specifically, the seat crosses 64A, 64B have respective main bodies 65A, 65B that are Π-shaped in a cross section. The main bodies 65A, 65B have openings that face the back plate 73 of the rear panel 70 that serves as the partition wall. Further, the seat crosses 64A, 64B include respective upper flanges 66A, 66B provided to extend upward from upper ends of the main bodies 65A, 65B and lower flanges 67A, 67B provided to extend downward from lower ends of the main bodies 65A, 65B.

As will be described later, engagement claws 32 provided on a back face 30B of each seatback 30 (see FIG. 4) are hooked on the upper flange 66A of the seat cross 64A disposed at a relatively upper position. Such a hooked support structure allows the seat cross 64A (and the seat cross 64B) to be separate (floating) from the back plate 73 of the rear panel 70. In other words, the seat crosses 64A, 64B are supported by the back plate 73 with a gap L1 (see FIG. 7) therebetween via the support columns 62 serving as the fixtures.

That is, the support columns 62 function as spacers for separating the seat crosses 64A, 64B and the back plate 73 from each other. From this point of view, the seat crosses 64A, 64B may be supported by the back plate 73 of the rear panel 70 via brackets that are small piece members, instead of the support columns 62.

Further, as will be described later, the gap L1 formed due to the hooking structure of the seatbacks 30 serves as a belt path through which each webbing 51 extends from the retractor 52 to the shoulder anchor 53. The lower flange 67B of the seat cross 64B, which is located between each retractor 52 and each shoulder anchor 53 and closer to the retractor 52 than to the shoulder anchor 53, is formed with a bent portion 67B1 at a position facing the webbing 51 extending through the belt path. The bent portion 67B1 thus formed suppresses a contact between the lower flange 67B and the webbing 51, to thereby prevent the webbing 51 from being damaged by an edge of the lower flange 67B. This detailed structure will be described later.

<Seatback>

As shown in FIG. 4, each seatback 30 includes the back plate part 31 and the engagement plate 34, for example. As described above, since each headrest 22 is supported by the rear panel 70 (see FIG. 5) instead of by the seatback 30, the support rigidity of the seatback 30 is reduced accordingly, to thereby simplify the structure.

For example, the seatback 30 is configured to include two members, the back plate part 31 and the engagement plate 34. The back plate part 31 is made of resin, for example, and has a structure in which a surface 30A has a predetermined elasticity. For example, the back plate part 31 may include a rectangular frame body and a mesh disposed within the frame body.

The engagement plate 34 is disposed on the back face 30B of the seatback 30. The engagement plate 34 is disposed, for example, in an upper part of the back face 30B of the seatback 30. The engagement plate 34 is a plate member provided to extend substantially vertically from the back face 30B of the seatback 30. Furthermore, the engagement claws 32 are disposed at a rear end of the engagement plate 34. The engagement claws 32 are provided in a pair, for example, along the vehicle width direction. The engagement plate 34 and the engagement claws 32 are integrally molded, for example.

For example, a vehicle front-rear dimension L3 of the engagement plate 34 is set to be equal to or larger than a vehicle front-rear dimension L4 of each of the main bodies 65A, 65B of the seat crosses 64A, 64B (see FIG. 5, FIG. 7). By setting these dimensions in this manner, the engagement claws 32 can be hooked on the upper flange 66A of the seat cross 64A.

As shown in FIG. 4, a fastening hole 36 penetrating from the surface 30A to the back face 30B is formed at the center of a lower part of the back plate part 31. After the engagement claws 32 are hooked on the upper flange 66A of the seat cross 64A, the fastening hole 36 of each back plate part 31 is aligned with a fastening hole of each seatback bracket 68 (see FIG. 5), and the back plate part 31 is fastened to the seatback bracket 68 with a bolt and a nut. As a result, the back face 30B of the seatback 30 is supported by the seat crosses 64A, 64B that are the supporting members.

<Seat Belt Mechanism>

As shown in FIG. 5, each seat belt mechanism 50 includes the webbing 51, the retractor 52, the shoulder anchor 53, the belt anchor 54, the belt buckle 55, and the tongue plate 56. The webbing 51 is a belt, and is pulled up from the retractor 52 behind the seatback 30, then folded back at the shoulder anchor 53, and pulled out forward and downward of the seatback 30, and furthermore, an end of the webbing is fixed to the belt anchor 54.

The retractor 52 takes up and accommodates the webbing 51. For example, the retractor 52 may be a well-known take-up device with a locking mechanism. The retractor 52 is supported by the rear panel 70 that serves as the partition wall. For example, as shown in FIG. 2 and FIG. 5, each retractor 52 is disposed between the adjacent seats 20, 20. The retractors 52 are disposed below the seat cross 64B.

Each shoulder anchor 53 has a through hole 53A through which the webbing 51 is inserted. The shoulder anchor 53 is supported to the rear panel 70 at a position higher than a support position of the retractor 52. For example, the shoulder anchor 53 is supported and fixed to the top plate 74 of the rear panel 70.

Each belt anchor 54 is supported to a lower end of the back plate 73 of the rear panel 70, for example. The webbing 51 is inserted through the tongue plate 56 in such a manner that the tongue plate 56 is located between the shoulder anchor 53 and the belt anchor 54. In addition, the belt buckle 55 is supported by the back plate 73 of the rear panel 70 at a position on the opposite side of the seat 20 from the belt anchor 54.

The belt path through which the webbing 51 extends from the retractor 52 to the shoulder anchor 53 is provided in the gap L1 between the seat crosses 64A, 64B that are the support members and the back plate 73 of the rear panel 70 that is the partition wall.

With reference to FIG. 6, for example, among the gap L1 between the seat crosses 64A, 64B and the back plate 73 of the rear panel 70, a separation distance L2 between the through hole 53A of each shoulder anchor 53 and the back plate 73, and a separation distance L3 between an outer peripheral surface 52A1 of the winding roll 52A of each retractor and the back plate 73, there is a relationship: L1>L3>L2.

By setting the gap L1 to be larger than the separation distance L2 and the separation distance L3, the belt path of the webbing 51 from the retractor 52 to the shoulder anchor 53 is secured within the gap L1. Further, by setting the separation distances to satisfy L2<L3, the lower end of the webbing 51; that is, a portion of the webbing 51 near the retractor 52, is taken up toward the seat cross 64B, as illustrated in FIG. 6 and FIG. 7.

In the seat structure according to the present embodiment, the lower flange 67B of the seat cross 64B is formed with the bent portion 67B1 (see FIG. 7). The bent portion 67B1 is formed in the lower flange at a position where the lower flange 67B faces the webbing 51. The bent portion 67B1 is cut off on both sides in the vehicle width direction at this position from the lower flange 67B, and is bent so as to be separate from the webbing 51. Assuming that the webbing 51 moves out of control at the time of being taken up by the retractor 52, the vehicle width dimension of the bent portion 67B1 is set to be twice or more the width dimension of the webbing 51, for example.

The present disclosure is not limited to the present embodiments described above, and includes all changes and modifications without departing from the technical scope or the essence of the present disclosure defined by the claims.

The invention claimed is:

1. A vehicle seat structure comprising:
a partition wall provided upright to partition an inside and an outside of a vehicle;
a seat support body that includes a fixture fixed to the partition wall, and a support member supported by the partition wall with a gap via the fixture;
a seatback that is supported on a back face thereof by the support member;
a retractor that is supported by the partition wall, and takes up and accommodates a webbing of a seatbelt mechanism; and
a shoulder anchor that is supported by the partition wall at a position higher than a support position of the retractor, the webbing being inserted through the shoulder anchor,
a belt path through which the webbing extends from the retractor to the shoulder anchor being formed in the gap between the support member and the partition wall.

2. The vehicle seat structure according to claim 1, wherein
the support member includes a seat cross extending in a vehicle width direction, the seat cross being disposed between the shoulder anchor and the retractor in a vehicle height direction and closer to the retractor than to the shoulder anchor,
the seat cross is formed in a hat-shape in a cross section including: a main body that is Π-shaped in a cross section and has an opening facing the partition wall; an upper flange provided to extend upward from an upper end of the main body; and a lower flange provided to extend downward from a lower end of the main body, and
the lower flange is formed with a bent portion at a position of the lower flange facing the webbing extending through the belt path in such a manner that the bent portion is cut off on both sides in a vehicle width direction at the position and is bent so as to be separate from the webbing.

* * * * *